Jan. 1, 1957   J. R. VAWTER   2,775,826
EDUCATIONAL DEVICE
Filed July 1, 1955   2 Sheets-Sheet 1
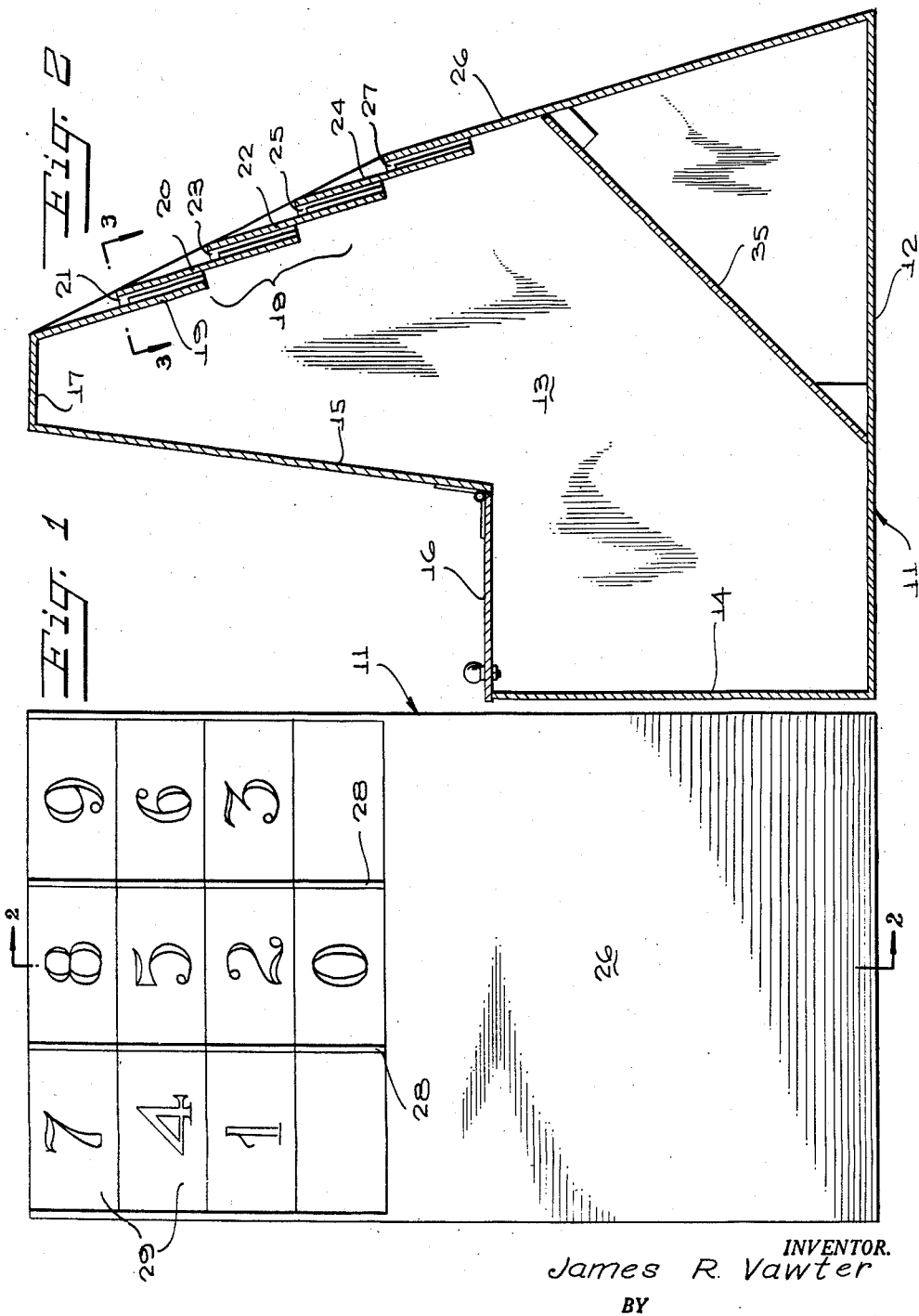
INVENTOR.
James R. Vawter
BY
McMorrow, Berman & Davidson
Attorneys Jan. 1, 1957  J. R. VAWTER  2,775,826
EDUCATIONAL DEVICE
Filed July 1, 1955  2 Sheets-Sheet 2
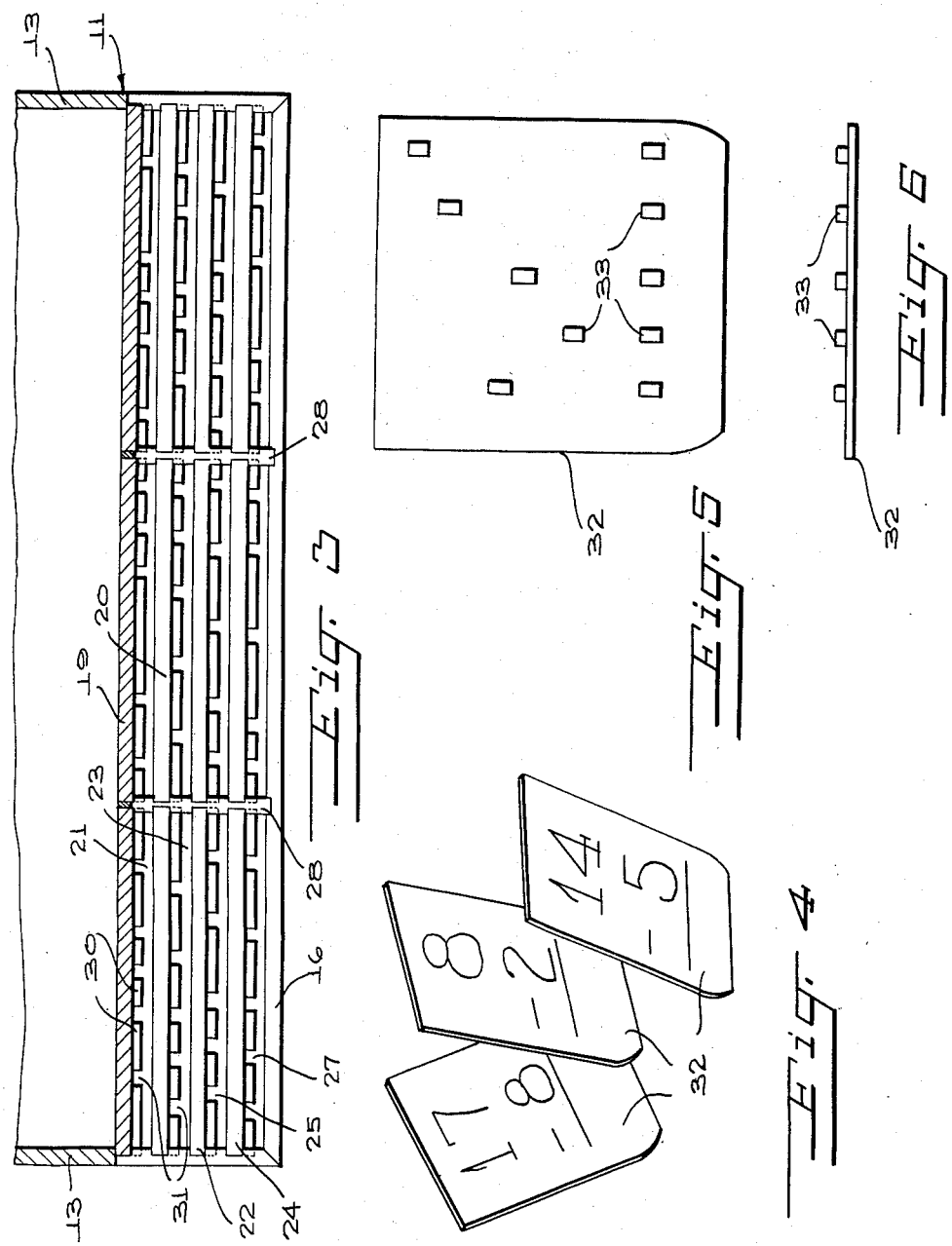
INVENTOR.
James R. Vawter
BY
McMorrow, Berman + Davidson
Attorneys

United States Patent Office 2,775,826
Patented Jan. 1, 1957

2,775,826

EDUCATIONAL DEVICE

James R. Vawter, Englewood, Colo.

Application July 1, 1955, Serial No. 519,429

2 Claims. (Cl. 35—9)

This invention relates to educational devices, and more particularly to an educational device of the type employing problem cards which must be inserted through predetermined slots or openings in a receptacle, the cards matching the slots or openings when correctly inserted therein.

A main object of the invention is to provide a novel and improved educational device employing a receptacle having slots and having problem cards which are arranged so that they may be inserted into the receptacle through specified slots, corresponding to the answers associated with the problems on the respective cards, the device being simple in construction, being easy to use, and stimulating interest in the subject matter associated with the cards and slots so that the device is especially suitable for use in schools and educational institutions.

A further object of the invention is to provide an improved educational device of the type comprising a receptacle having openings or slots therein adapted to receive problem cards, the cards being arranged to fit only specified openings or receptacles associated with the answers to the problems appearing on the cards, the device being inexpensive to manufacture, being durable in construction, being suitable for a wide range of material, encouraging a student to select correct answers to the problems appearing on the cards by providing an incentive to learn such answers, being usable by students without supervision of teachers or other persons, being useful for drill work in the school or at home, and being readily adaptable for use with a wide range of educational material.

Further objects and advantages of the invention will become apparent from the following description and claims, and from the accompanying drawings, wherein:

Figure 1 is a front elevational view of the receptacle comprising part of an improved educational device according to the present invention.

Figure 2 is a vertical cross sectional view taken on the line 2—2 of Figure 1.

Figure 3 is an enlarged cross sectional view taken on the line 3—3 of Figure 2.

Figure 4 is a perspective view of a number of problem cards forming part of the educational device of the present invention and adapted to be employed with the receptacle of Figures 1, 2 and 3.

Figure 5 is an enlarged rear elevational view of one of the problem cards of Figure 4.

Figure 6 is a top view of the problem card of Figure 5.

Referring to the drawings, the educational device comprises a container or housing 11 having a bottom wall 12, vertical side walls 13, 13, a vertical back wall 14, an upper back wall segment 15 forwardly offset with respect to the vertical wall 14 and provided with a hinged cover member 16 which may be elevated to provide access to the interior of the container 11, a relatively narrow top wall 17, and a downwardly and forwardly inclined front wall designated generally at 18 and extending from the front edge of top wall 17 to the front edge of bottom wall 12, as is clearly shown in Figure 2.

Front wall 18 slopes forwardly and downwardly from top wall 17 to the forward edge of bottom wall 12 and comprises an inclined top section 19 secured rigidly between the side walls 13, 13, a second inclined wall section 20 spaced from and parallel to the first section 19 and defining a slot 21 between the sections 19 and 20, a third inclined wall section 22 rigidly secured between the side walls 13, 13, spaced forwardly of and parallel to the lower portion of the wall section 20 and defining a slot 23 therebetween, a fourth inclined wall section 24 secured rigidly between the side walls 13, 13 and spaced from and parallel to the lower portion of the wall section 22, defining a slot 25 therebetween, and an inclined lower front wall section 26 secured rigidly between the side walls 13, 13, the upper portion of the wall section 26 being spaced from and being parallel to the lower portion of the wall section 24 and defining a slot 27 therewith.

Respective partition bar elements, shown at 28, 28 are secured transversely across the slots 21, 23, 25 and 27, subdividing the slots into respective spaced horizontal sections, the outer face of each front wall portion immediately above each section being inscribed with a number or other answer symbol, for example, with numerals such as are inscribed on the faces 29 of the wall sections of the container 11 of Figure 1 wherein the container 11 forms part of an educational device, according to this invention, for use in teaching arithmetic.

Secured in each of the sections of the respective slots 21, 23, 25 and 27 are spaced, parallel block elements 30 having different widths and having different spacings therebetween in each of the different slot sections, whereby the arrangement of the spacings between the blocks, shown at 31, differs for each slot section. Each slot section is thus arranged to slidably receive a specific problem card, such as one of the problem cards 32 shown in Figure 4, each problem card being provided on its rear surface with a plurality of spaced lugs or projections 33 having spacings corresponding in arrangement and size to spacings 31 of a specific slot section, the slot section corresponding to the answer associated with a group of problem cards. Thus, each group of problem cards may include a number of arithmetical problems having the same answer, this answer being one of the numbers appearing on a face 29 over a particular slot section. Each card of the aforesaid group is provided with projections 33 on its back surface which are so arranged that each card of this group will slidably interfit in the same slot section and will thus be slidable therethrough when inserted in the slot section.

Respective groups of problem cards are provided associated with the respective answers appearing on the faces 29 of the container 11, because of each group being characterized by an arrangement of projections 33 which interfit with the arrangement of slot grooves 31 of a particular slot section.

In using the device, a pupil will endeavor to correctly place the cards 32 so that they will slip through the slot sections into the receptacle 11. The top ends of the blocks 30 are spaced sufficiently below the top edges of the respective forward elements 20, 22, 24 and 26 of the respective slots so that the lower portion of a card may be inserted in a slot section, whereby said lower portion will be retained in the slot section regardless of whether or not the correct slot section is chosen. However, the card will not pass through the slot section unless the projections 33 thereof are properly spaced to interfit with the grooves 31 of the slot section.

Designated at 35 is an inclined baffle plate secured inside the container below the lowermost slot 27, as shown in Figure 2, and extending downwardly and rearwardly from the lowermost wall section 26 to the bottom wall 12, whereby cards dropping through the slots will be deflected downwardly and rearwardly by the baffle plate 35 and will accumulate in the space below the hinged closure member 16. Thus, the cards may be readily collected after they have been all inserted through the slots 21, 23, 25 and 27, by merely raising the hinged closure 16, whereby access to the accumulated cards in the rear portion of the container 11 is obtained.

While illustrated and above described specifically in connection with arithmetic problems, the device may be obviously employed in connection with any type of educational material wherein problems may be inscribed on cards and wherein answers may be selected from a group of such answers appearing on faces 29 of the receptacle 11.

By its construction, the apparatus above described makes it possible to select the correct slot section only by matching the problem to the correct answer. The actual groove elements of the various slot sections are hidden from the view of the pupil selecting the sections since the top ends of the blocks 30 are spaced substantial distances below the top edges of the wall elements 20, 22, 24 and 26. As shown in Figures 5 and 6, the projections 33 are purposely spaced away from the edges of the cards, making it difficult to recognize and match cards having similar projection spacings and arrangements. Furthermore, as shown in Figure 5, the projections 33 may be arranged with random vertically spaced positions so that two cards having a similar configuration horizontally will still appear different when their projections 33 are spaced differently vertically.

As will be readily apparent, children will employ the device in the manner of a game apparatus and will be encouraged to learn the correct answers to the problems appearing on the cards, since this will facilitate the rapid insertion of the cards through their associated slot sections. Thus, the device may be employed as an aid in encouraging a child to learn specific information, either individually, or in competition with other children. The apparatus thus affords a novel and exciting incentive for children to learn many of the basic memory facts and to maintain the interest of the children during an entire drill period wherein the apparatus is employed.

By the provision of the baffle member 35, the cards are automatically shuffled as they are dropped into the receptacle, so that the cards are in a random arrangement when they are collected.

While a specific embodiment of an improved educational apparatus has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An educational device comprising a container formed with a front wall sloping forwardly and downwardly and having a plurality of inclined sections arranged in superimposed spaced parallel relation below said front wall with the uppermost one of said sections forming with said front wall and answer slot and each of the adjacent sections forming an answer slot, the wall inside each slot being provided with spaced ribs defining a plurality of spaced grooves, and each slot differing in the spatial arrangement of its grooves, and groups of problem-bearing cards, each card bearing a single problem on its face and being provided with spaced projections on its back, the arrangement of projections on the cards within a respective group being identical to and corresponding to the arrangement of the grooves of a respective slot of the container associated with the correct answer to the problems on the cards of said respective group, whereby the problem-bearing cards may be inserted into the container only through slots associated with the correct answers to the problems on the faces of the cards.

2. An educational device comprising a container having an inclined front wall formed with a plurality of answer slots, the wall of the container inside each slot being provided with spaced ribs defining a plurality of spaced grooves, and each slot differing in the spatial arrangement of its grooves, groups of problem-bearing cards, each card bearing a single problem on its face and being provided with spaced projections on its back, the arrangement of projections on the cards within a respective group being identical to and corresponding to the arrangement of the grooves of a respective slot of the container associated with the cards of said respective group, whereby the problem-bearing cards may be inserted into the container only through slots associated with the correct answers to the problems on the faces of the cards, and an inclined baffle plate secured inside the container below the slots and extending downwardly and rearwardly from said front wall to the bottom of the container.

References Cited in the file of this patent

UNITED STATES PATENTS

| 2,656,617 | Composto | Oct. 27, 1953 |
| 2,701,423 | Merrill | Feb. 8, 1955 |